(12) United States Patent
Spiegel

(10) Patent No.: US 11,596,128 B2
(45) Date of Patent: Mar. 7, 2023

(54) FLUID DIRECTING GROOMING GLOVE APPARATUS

(71) Applicant: William G. Spiegel, Bonney Lake, WA (US)

(72) Inventor: William G. Spiegel, Bonney Lake, WA (US)

( * ) Notice: Subject to any disclaimer, the term of this patent is extended or adjusted under 35 U.S.C. 154(b) by 508 days.

(21) Appl. No.: 16/748,155

(22) Filed: Jan. 21, 2020

(65) Prior Publication Data

US 2021/0219521 A1    Jul. 22, 2021

(51) Int. Cl.
| | |
|---|---|
| A01K 13/00 | (2006.01) |
| A47L 9/02 | (2006.01) |
| A47K 7/02 | (2006.01) |
| A41D 19/00 | (2006.01) |

(52) U.S. Cl.
CPC .............. *A01K 13/001* (2013.01); *A47K 7/02* (2013.01); *A47L 9/02* (2013.01); *A41D 19/0024* (2013.01)

(58) Field of Classification Search
CPC ........... A01K 13/001; A47K 7/02; A47L 9/02; A41D 19/0024
See application file for complete search history.

(56) References Cited

U.S. PATENT DOCUMENTS

| | | | | |
|---|---|---|---|---|
| 1,530,327 | A | * | 3/1925 | Redlick ................... A47L 13/19 D2/614 |
| 1,558,930 | A | * | 10/1925 | Schuck .............. A41D 19/0079 239/529 |
| D272,568 | S | | 2/1984 | Kuhl |
| 4,766,914 | A | * | 8/1988 | Briggs .................... A45D 20/00 132/212 |
| 5,028,077 | A | * | 7/1991 | Hurst ...................... F16L 37/48 285/259 |
| 5,095,853 | A | * | 3/1992 | Kruger ................. A01K 13/002 119/606 |
| 5,120,304 | A | * | 6/1992 | Sasaki .................... A61B 42/00 604/35 |
| 5,169,251 | A | * | 12/1992 | Davis ..................... A47L 23/10 401/266 |
| 5,502,873 | A | | 4/1996 | Hogan |
| 5,632,231 | A | * | 5/1997 | Moore ................. A01K 13/001 D30/123 |
| 5,722,349 | A | * | 3/1998 | Wolgamuth ....... A41D 19/0079 119/632 |
| 5,768,709 | A | | 6/1998 | Newkirk |
| 6,109,214 | A | * | 8/2000 | Rampersad .............. A46B 5/04 401/7 |

(Continued)

*Primary Examiner* — Ebony E Evans

(57) ABSTRACT

A fluid directing grooming glove apparatus for vacuuming and washing pets includes a glove body having a glove opening configured to receive a user's hand. A fluid diverter is coupled to the glove body and has a hose aperture and a plurality of tube apertures. Each tube aperture is in fluid communication with the hose aperture. A plurality of finger tubes is coupled to the glove body and attached to, and in fluid communication with, the tube apertures of the fluid diverter. A feed hose is coupled to the fluid diverter. The feed hose has a hose distal end attached to, and in fluid communication with, the hose aperture and a hose connector coupled to a hose proximal end. The hose connector attaches to a vacuum hose or a water hose to either suck air or spray water through the finger tubes.

4 Claims, 3 Drawing Sheets

(56) References Cited

U.S. PATENT DOCUMENTS

| | | | |
|---|---|---|---|
| 6,409,688 B1 * | 6/2002 | Hennenfent | A61B 42/10 |
| | | | 601/19 |
| 7,347,166 B2 | 3/2008 | Roman-Barcelo | |
| 8,088,086 B1 | 1/2012 | Schmuck | |
| 8,286,592 B2 * | 10/2012 | Moinester | A01K 13/001 |
| | | | 119/665 |
| 9,125,978 B2 | 9/2015 | Frost | |
| 9,764,476 B1 | 9/2017 | Green | |
| 10,206,753 B2 * | 2/2019 | Tarlian, Jr. | A61B 42/10 |
| 2006/0207518 A1 | 9/2006 | Steffen | |
| 2008/0190376 A1 | 8/2008 | Matsumoto | |

\* cited by examiner

FLUID DIRECTING GROOMING GLOVE APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to pet grooming devices and more particularly pertains to a new pet grooming device for vacuuming and washing pets.

(2) Description of Related Art Including Information Disclosed Under 37 CFR 1.97 and 1.98

The prior art relates to pet grooming devices. Existing devices do not serve to direct fluid flow in both directions—suction from a vacuum or water from a water supply line. While some devices are intended to be worn as a glove, such devices are mostly brushes and incorporate added functionality on the palm side (ventral side), thus diminishing the user's ability to stroke the pet normally while simultaneously performing the grooming function.

BRIEF SUMMARY OF THE INVENTION

An embodiment of the disclosure meets the needs presented above by generally comprising a glove body having a glove opening configured to receive a user's hand. A fluid diverter is coupled to the glove body and has a hose aperture and a plurality of tube apertures. Each tube aperture is in fluid communication with the hose aperture. A plurality of finger tubes is coupled to the glove body and attached to, and in fluid communication with, the tube apertures of the fluid diverter. A feed hose is coupled to the fluid diverter. The feed hose has a hose distal end attached to, and in fluid communication with, the hose aperture and a hose connector coupled to a hose proximal end. The hose connector is configured to attach to, and be in fluid communication with, a vacuum hose or a water hose.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
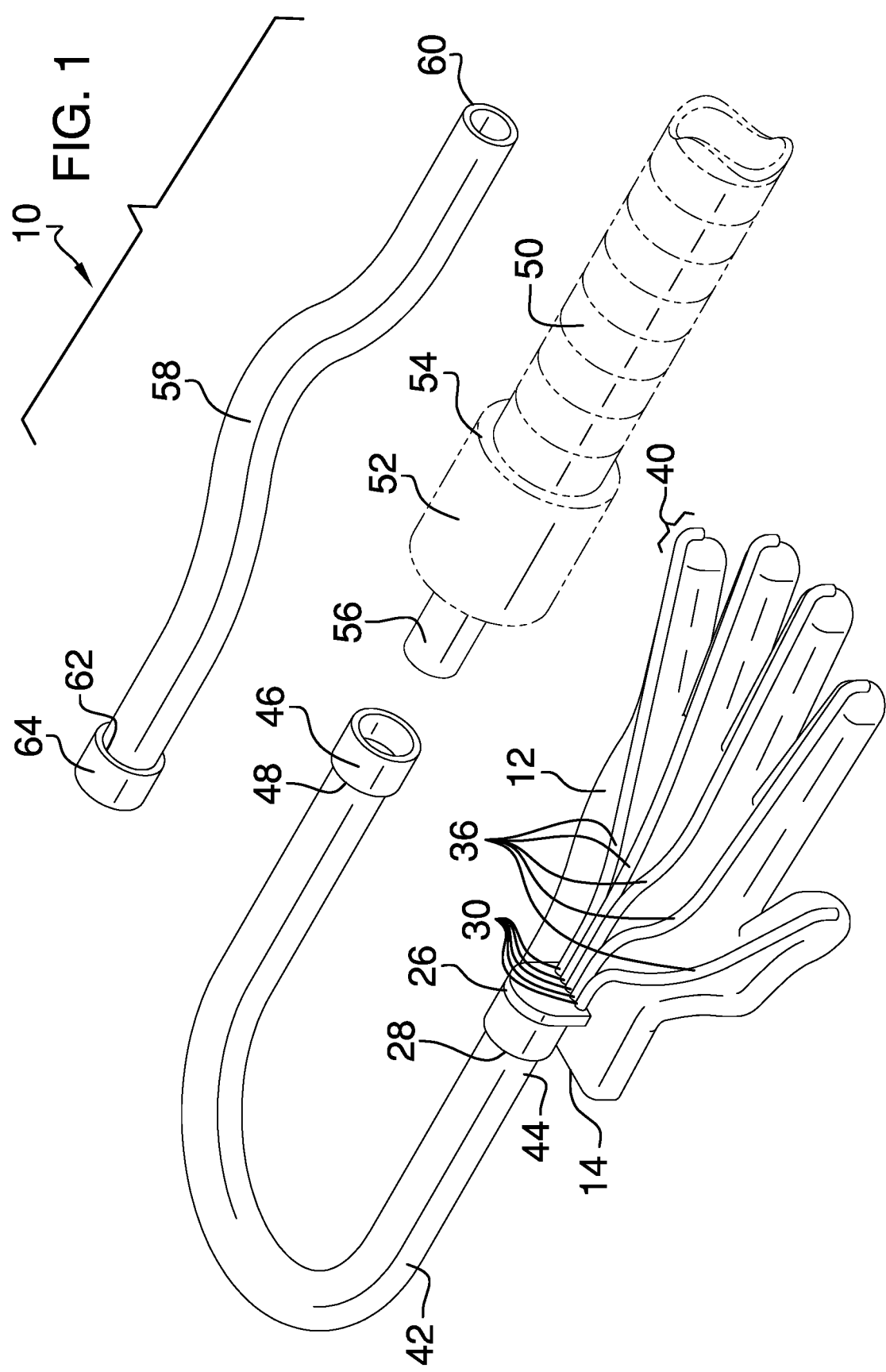
FIG. 1 is an isometric view of a fluid directing grooming glove apparatus according to an embodiment of the disclosure.
Figure 2:
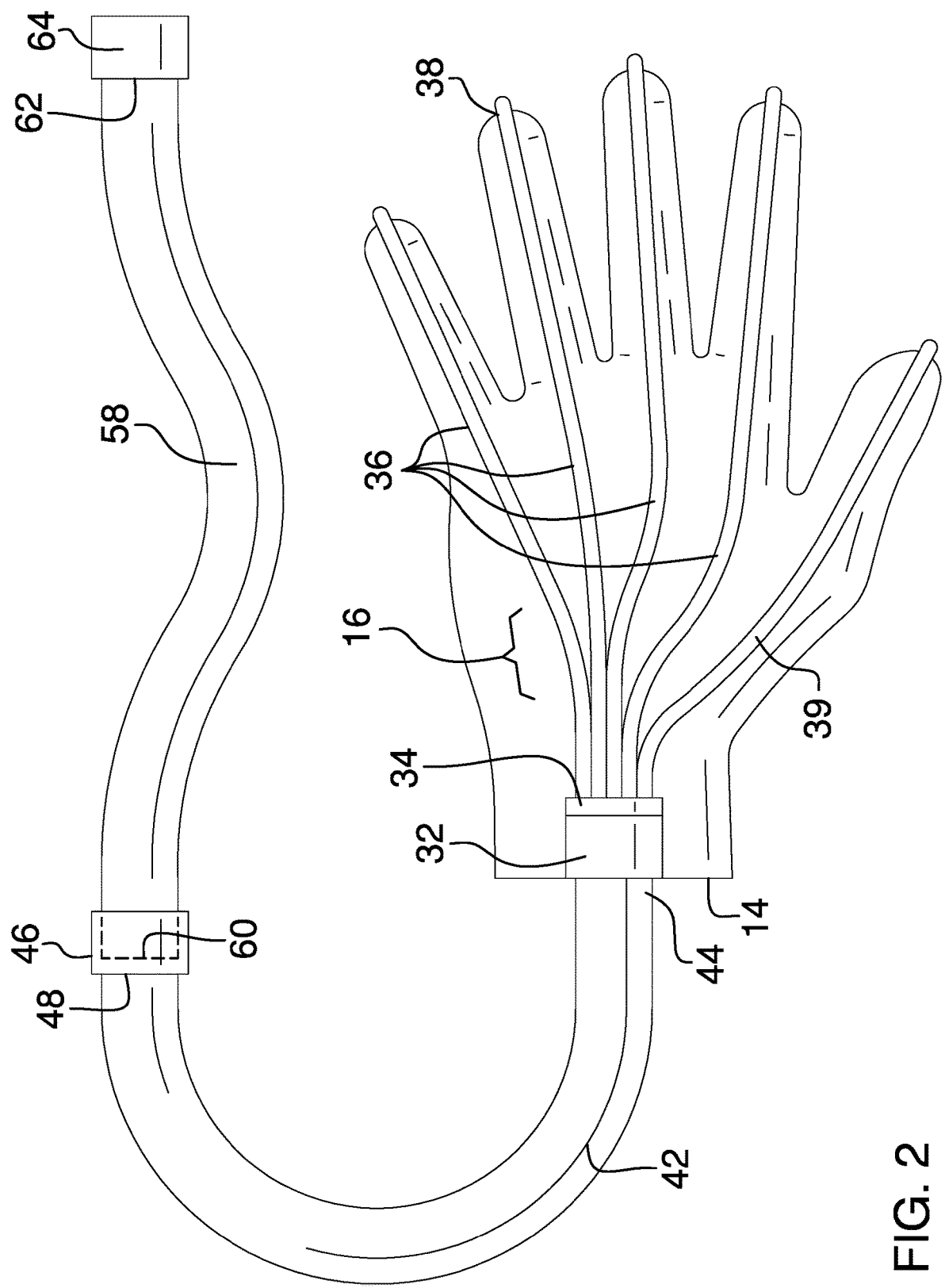
FIG. 2 is a top plan view of an embodiment of the disclosure.
Figure 3:
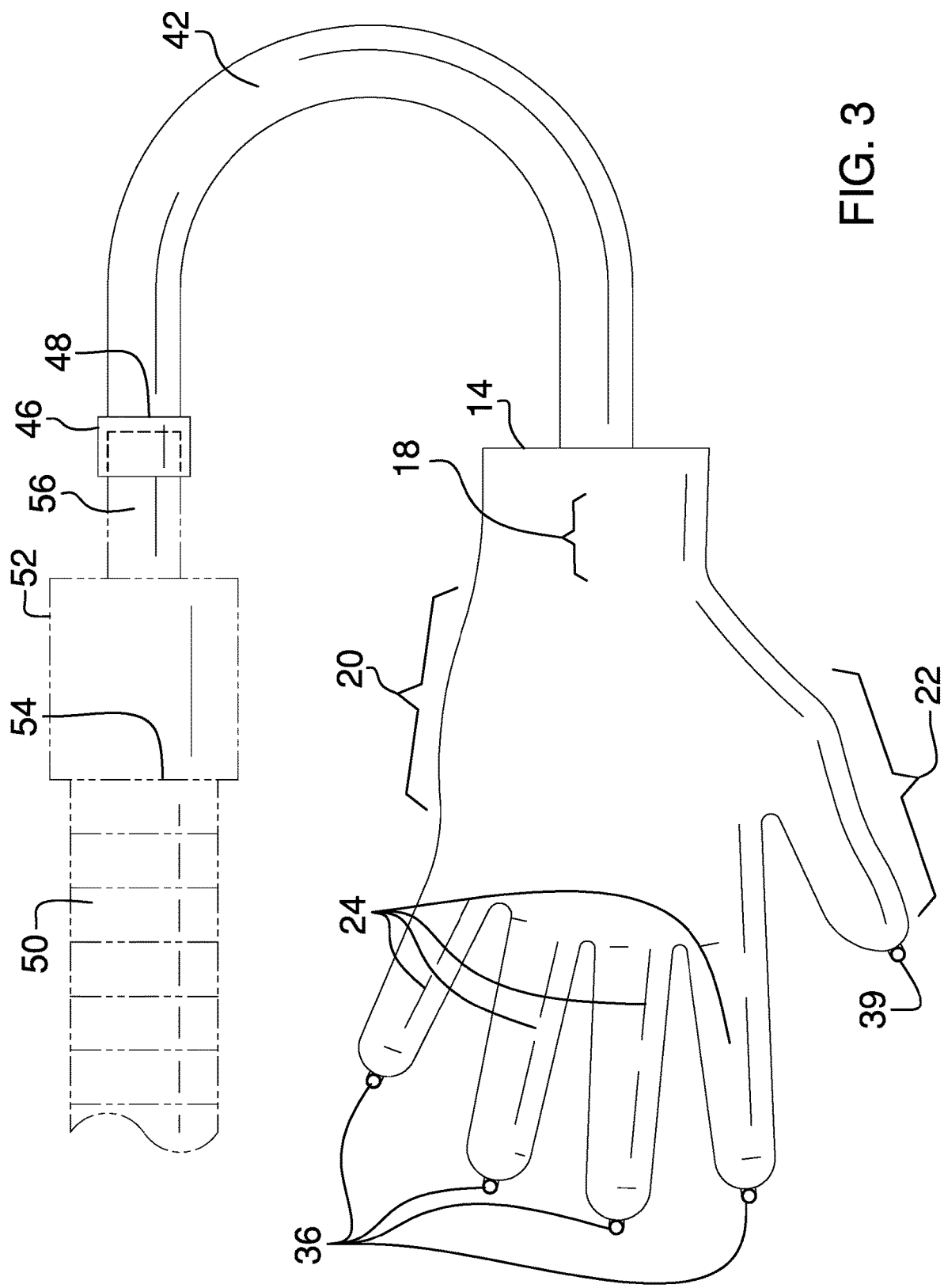
FIG. 3 is a bottom plan view of an embodiment of the disclosure.

With reference now to the drawings, and in particular to FIGS. 1 through 3 thereof, a new pet grooming device embodying the principles and concepts of an embodiment of the disclosure and generally designated by the reference numeral 10 will be described.

As best illustrated in FIGS. 1 through 3, the fluid directing grooming glove apparatus 10 generally comprises a glove body 12 having a glove opening 14 configured to receive a user's hand. The glove body 12 includes a dorsal side 16, a ventral side 18, a palm portion 20, a thumb portion 22, and a set of finger portions 24. The glove body 12 may alternatively be a mitt. The glove body 12 is a water-tolerant material and may be neoprene or nylon in order to provide a more comforting sensation while stroking a pet than a rubber or vinyl material.

A fluid diverter 26 is coupled to the glove body 12. The fluid diverter 26 is coupled to the dorsal side 16 adjacent the glove opening 14. The fluid diverter 26 has a hose aperture 28 and a plurality of tube apertures 30. Each tube aperture 30 is in fluid communication with the hose aperture 26 to divide the fluid flow. The fluid diverter 26 may have a cylindrical sleeve portion 32 and a hollow splitter portion 34 perpendicularly coupled to the sleeve portion 32. The sleeve portion 32 extends from around the perimeter of the hose aperture 28 and may terminate coplanar with the glove opening 14. The splitter portion 32 may have a rounded outer edge conforming to the cylindrical sleeve portion 32 to streamline the apparatus 10 and eliminate corners that would irritate the user or the pet. The plurality of tube apertures 30 may be arranged in an array adjacent the dorsal side 16 of the glove body.

A plurality of finger tubes 36 is coupled to the glove body 12. The finger tubes 36 are attached to, and in fluid communication with, the tube apertures 30 of the fluid diverter.

The plurality of finger tubes 36 extend along the dorsal side 16 of the glove body and terminate at a finger distal end 38 of each finger portion. There may be a set of five finger tubes 36 comprising a thumb tube 39 extending along the thumb portion 22 and one finger tube 36 extending along each finger portion 24. The finger tubes 36 are flexible to accommodate natural movement of the user's hand within the glove body 12. Each finger tube 36 may have a curved portion 40 at the finger distal end 38 to direct the fluid flow towards the ventral side 18 while the user strokes the pet.

A feed hose 42 is coupled to the fluid diverter 26. The feed hose 42 has a hose distal end 44 attached to, and in fluid communication with, the hose aperture 28. The sleeve portion 32 of the fluid diverter provides additional support to the feed hose 42. The feed hose 42 is thus directed in the direction of the user's arm and prevents interference during use of the apparatus 10. The feed hose 42 has a hose connector 46 coupled to a hose proximal end 48. The hose connector 46 is configured to attach to, and be in fluid communication with, a vacuum hose 50 or a water hose. A vacuum coupler 52 may have a female end 54 configured to receive the vacuum hose 50 and a male end 56 to engage within the hose connector 46. The feed hose 42 is flexible to allow easy movement for the user and may be at least six feet in length for user convenience as well as to distance the pet from the vacuum attached to the vacuum hose 50 to improve tranquility.

A faucet adaptor 58 may be included to provide water to the apparatus 10 directly from a sink faucet. An adaptor distal end 60 of the faucet adaptor 58 is selectively engageable with the hose connector 46 and an adaptor proximal end 62 has a faucet connector 64 configured to attach to, and be in fluid communication with, the sink faucet. The faucet adaptor 58 may be the same flexible tubing utilized by the feed hose 42.

In use, the hose connector 46 is attached to the desired fluid source, either directly or by utilizing the vacuum coupler 52 or the faucet adaptor 58. The user then wears the glove body 12 and strokes the pet. The finger tubes 36 either suck up fur, dander, and fleas or distribute water while washing the pet.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fluid directing grooming glove apparatus comprising:
   a glove body having a glove opening configured to receive a user's hand, the glove body including a dorsal side, a ventral side, a palm portion, a thumb portion, and a set of finger portions;
   a fluid diverter coupled to the glove body, the fluid diverter being coupled to the dorsal side adjacent the glove opening, the fluid diverter having a hose aperture and a plurality of tube apertures, each tube aperture being in fluid communication with the hose aperture, the fluid diverter having a cylindrical sleeve portion and a hollow splitter portion perpendicularly coupled to the sleeve portion, the sleeve portion extending around the hose aperture, the hollow splitter portion having a planar surface facing the set of finger portions and proximate to the glove opening wherein the planar surface and glove opening are configured for being grasped to facilitate holding the glove body while inserting the user's hand into the glove body through the glove opening;
   a plurality of finger tubes coupled to the glove body, the finger tubes being attached to, and in fluid communication with, the tube apertures of the fluid diverter, the plurality of finger tubes extending along the dorsal side of the glove body and terminating at a finger distal end of each finger portion; and
   a feed hose coupled to the fluid diverter, the feed hose having a hose distal end attached to, and in fluid communication with, the hose aperture, the feed hose having a hose connector coupled to a hose proximal end, the hose connector being configured to attach to, and be in fluid communication with, a vacuum hose or a water hose.

2. The fluid directing grooming glove apparatus of claim 1 further comprising the splitter portion having a rounded outer edge conforming to the cylindrical sleeve portion.

3. The fluid directing grooming glove apparatus of claim 1 further comprising a faucet adaptor, an adaptor distal end of the faucet adaptor being selectively engageable with the hose connector and an adaptor proximal end having a faucet connector configured to attach to, and be in fluid communication with, a sink faucet.

4. A fluid directing grooming glove apparatus comprising:
   a glove body having a glove opening configured to receive a user's hand, the glove body including a dorsal side, a ventral side, a palm portion, a thumb portion, and a set of finger portions;
   a fluid diverter coupled to the glove body, the fluid diverter being coupled to the dorsal side adjacent the glove opening, the fluid diverter having a hose aperture and a plurality of tube apertures, each tube aperture being in fluid communication with the hose aperture;
   a plurality of finger tubes coupled to the glove body, the finger tubes being attached to, and in fluid communication with, the tube apertures of the fluid diverter, the plurality of finger tubes extending along the dorsal side of the glove body and terminating at a finger distal end of each finger portion;
   a feed hose coupled to the fluid diverter, the feed hose having a hose distal end attached to, and in fluid communication with, the hose aperture, the feed hose having a hose connector coupled to a hose proximal end, the hose connector being configured to attach to, and be in fluid communication with, a vacuum hose or a water hose;

a faucet adaptor, an adaptor distal end of the faucet adaptor being selectively engageable with the hose connector and an adaptor proximal end having a faucet connector configured to attach to, and be in fluid communication with, a sink faucet; and the fluid diverter having a cylindrical sleeve portion and a hollow splitter portion perpendicularly coupled to the sleeve portion, the sleeve portion extending around the hose aperture to secure the feed hose, the hollow splitter portion having a planar surface facing the set of finger portions and proximate to the glove opening wherein the planar surface and glove opening are configured for being grasped to facilitate holding the glove body while inserting the user's hand into the glove body through the glove opening, the splitter portion having a rounded outer edge conforming to the cylindrical sleeve portion.

* * * * *